Patented Oct. 28, 1924.

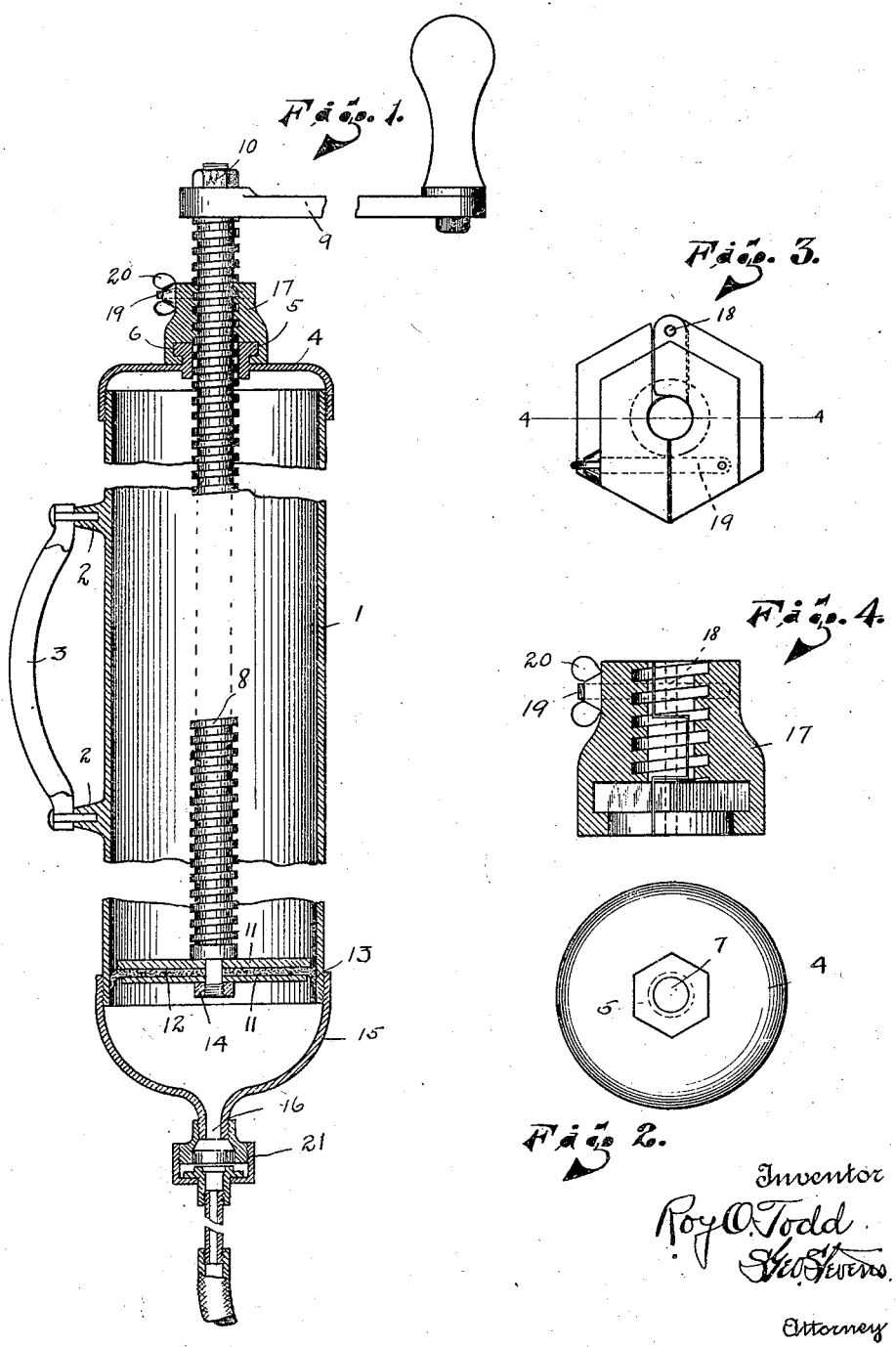

1,513,470

UNITED STATES PATENT OFFICE.

ROY O. TODD, OF SPOONER, WISCONSIN.

GREASE GUN.

Application filed August 12, 1922. Serial No. 581,391.

*To all whom it may concern:*

Be it known that I, ROY O. TODD, a citizen of the United States, residing at Spooner, in the county of Washburn and State of Wisconsin, have invented certain new and useful Improvements in Grease Guns, of which the following is a specification, reference being had therein to the accompanying drawing.

This invention relates to improvements in grease guns particularly for use in connection with the greasing of heavy machinery, such as tractors or the like, and has for its principal object the feature of being able to be filled very easily and in the least time possible.

Other objects and advantages of the invention will appear in the further description thereof.

Referring to the accompanying drawing forming part of this application in which like reference characters indicate like parts:

Figure 1 is a central vertical sectional view, partly in elevation, of one of the completely assembled guns:

Figure 2 is a top plan view of the top cap of the gun:

Figure 3 is a top plan view of the holding split nut: and

Figure 4 is a vertical sectional view of Figure 3.

1 is a hollow cylinder forming the body of the gun which has integrally formed thereupon two spaced lugs 2, into which is securely bolted the handle 3. The upper end of the body 1 is externally screw threaded for the reception of the internally screw threaded cap 4, which latter has integrally formed thereon the hexagonally shaped nut 5, said nut being provided with a shoulder 6; the purpose of which will be hereinafter explained.

The nut 5 of the cap 4 has an axial hole 7 therethrough which is of the same diameter as the outside diameter of the bolt 8, to which the operating lever 9 is attached in any suitable manner as at 10.

The lower end of the bolt 8 is reduced in size, said reduced portion being externally screw threaded and over which is slipped the two like metal washers 11 which are not quite as large in diameter as the inside diameter of the body member 1.

Between the washers 11 occurs the leather packing washer 12, it being larger than the inside diameter of the member 1 and therefore the outside rim of the washer is folded downwardly as at 13, and the three washers are securely held to the bolt 8, by the nut 14.

The lower end of the body member is also externally screw threaded for the reception of the bowl like bottom cap 15, the extreme end of which has a small opening 16 therein, the nozzle like termination of which is externally screw threaded for the reception of the common pipe union 21, which permits of different sizes of discharge pipes geing attached thereto, as the service of the device may require.

I have shown a split nut 17 seated upon the portion 5 of the cap 4, said nut having an axial opening therethrough which is threaded to mesh with the bolt 8, and the lower portion of the nut is milled out to fit about the hexagon nut and shoulder 6. The two portions of the nut are pivotally united by the through pin 18, and, when the nut is assembled about the bolt 8 as shown in Figure 1, are held together by the bolt 19, one end of which is fixed in any desired manner into one half of the nut and the other half of the nut is held thereto by the thumb nut 20 applied to the bolt 19.

Thus it will be seen that when it is desired to fill the gun with grease, the nut 17 is removed and the gun tipped up-side down so that the bolt 8 and parts connected thereto will fall to the upper end of the gun, the bottom cap removed and the gun filled with grease, and when the bottom cap is then replaced and the split nut applied, the turning of the operating lever 9 will force the grease out of the gun to the parts desired.

Having thus described my invention, what I claim and desire to secure by Letters Patent, is:

The combination of a cylinder head having an aperture therethrough, a polygonal extension about said aperture, an internally screw threaded split nut having in one end a polygonal shaped cavity to fit about said extension, clamping means for said nut, and a screw threaded rod located in said nut and slidably passing through said aperture in said head.

In testimony whereof I hereunto affix my signature in the presence of two witnesses.

ROY O. TODD.

Witnesses:
DOROTHY E. ROUNCE,
MABEL HALVERSON CURTIS.